H. N. BLACK.
Rice Cleaner.
No. 20,030. Patented April 27, 1858.
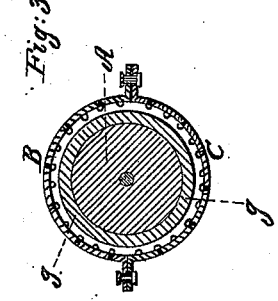
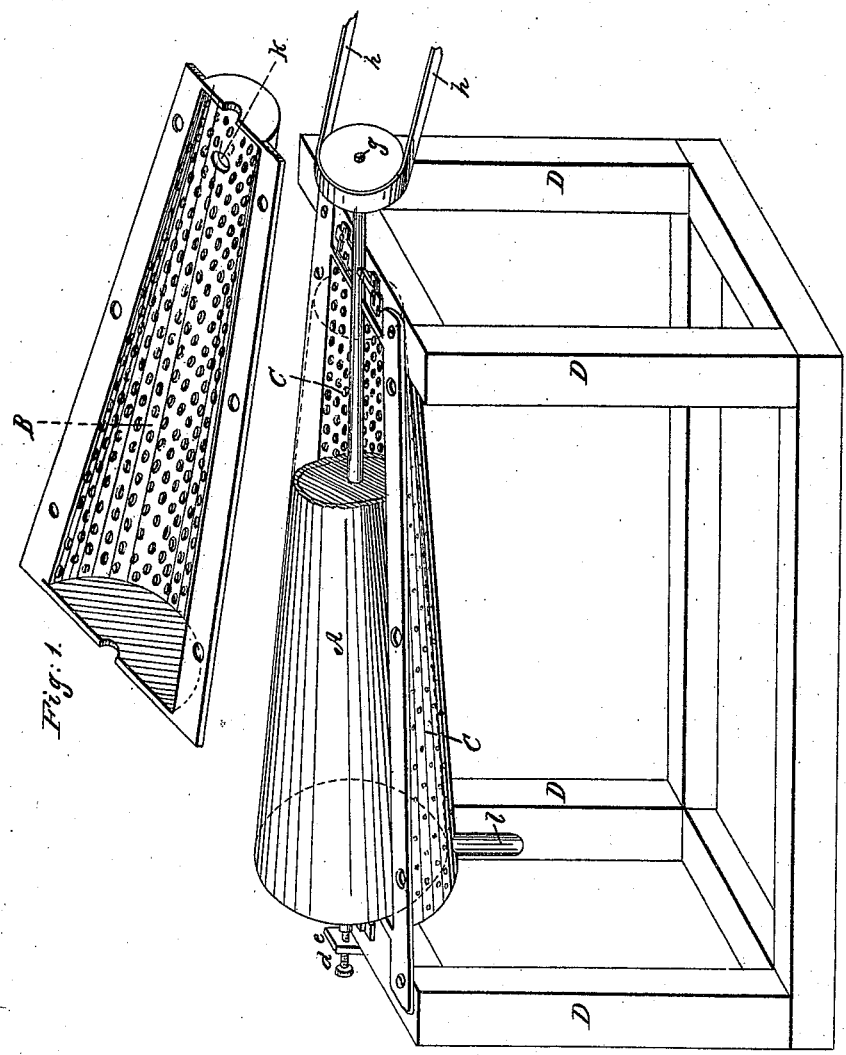
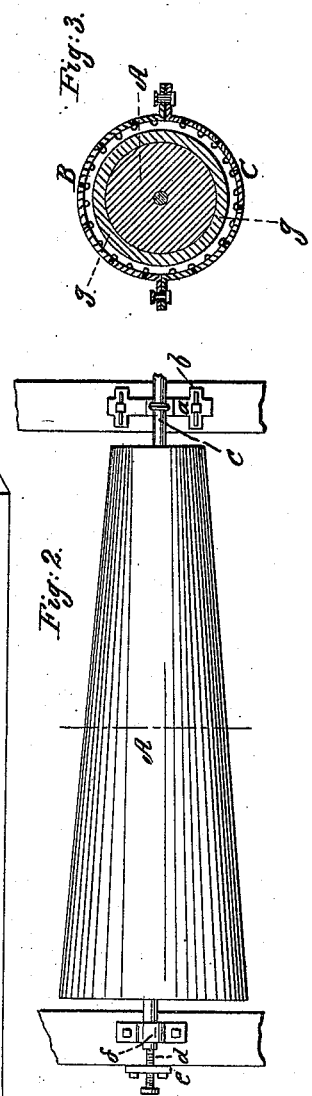

UNITED STATES PATENT OFFICE.

H. N. BLACK, OF PHILADELPHIA, PENNSYLVANIA.

RICE-HULLER.

Specification of Letters Patent No. 20,030, dated April 27, 1858.

*To all whom it may concern:*

Be it known that I, HORATIO N. BLACK, of the city and county of Philadelphia, State of Pennsylvania, have invented certain new and useful Improvements in Rice-Hullers, of which the following is a full, clear, and exact description, reference being had to the accompanying drawings, forming a part of this specification, in which—

Figure 1 represents a perspective view of a rice hulling machine embracing my improvements. Fig. 2 represents a plan of the hulling cone. Fig. 3 represents a transverse section of the hulling cone and casing.

The difficulty experienced in removing the hull from rice and other grains without breaking the kernel, has led to the invention of a great variety of hulling machines differing in form, in action and in the material of which the rubbing surfaces are made. These machines may be divided into two classes; those which act on the grain by percussion, and those which act by attrition. To the latter class my improvements relate. The machines of this class consist of a stationary and revolving disk, or of a revolving cylinder or cone, surrounded by a close casing. Between the plates, or between the cylinder and casing, the grain passes and is subjected to the rubbing action of the adjacent surfaces in order to remove the hull. Thes rubbing surfaces are either made of some hard unyielding material as metal or stone, with a rough grinding surface, or of two soft elastic surfaces of vulcanized rubber, or of a combination of both. The hard grinding surfaces while they perfectly remove the hull, break and cut the grain, which affects its market value, besides causing a heavy loss from the small pieces and flour being blown away during the process of winnowing. The two elastic surfaces of vulcanized rubber are not sufficiently hard or rough to perfectly remove the hull, and they are soon cut out and rendered worthless by the sharp edges of the grain and the cutting or serrated edges of the broken hull. The conical rubber has generally been arranged in a vertical position; in this position it is necessary to run it at very high velocity in order that the grain which passes rapidly through the machine may be subjected to a sufficient amount of attrition to remove the hull. The effect of this high velocity is to throw the grain with great force against the hard rough surface of the exterior case, by which it is broken, cut or otherwise injured in a much greater degree than it would be were the machine run at a lower velocity. The cylindrical rubber has been used in a horizontal position, but it is found not to work well, as from its form it cannot carry the grain without the aid of carriers attached to the revolving cylinder. These carriers give to the grain an irregular motion: those grains in contact or adjacent to them move forward more rapidly than those that are farther off. Thus some portions of the grain are under the action of the rubbers longer than others after the hull is removed, and the kernel itself, is subject to great attrition, which wearing it away increases the waste. These carriers also prevent the close adjustment of the rubbing surfaces leaving the passage between the rubbers so wide that the kernels and grain are piled on and override each other, and thus become crushed and broken by the action of the rubbing surface.

The object of my invention is to overcome some of the before mentioned defects in rice hullers, and my invention for effecting this object consists, first, in the application of an elastic rubbing surface, composed of vulcanized rubber, the surface or outer layer of which is incorporated with emery or other hard material that will give to it a gritty firm durable surface, possessing grinding and polishing properties when the same is combined with a hard, rough, mineral or metallic surface forming the adjacent rubber, by which means great durability is given to the elastic rubber, its abrading power is increased, while it possesses sufficient elasticity to yield to the grain and prevent it from being crushed as it passes through the machine.

In the accompanying drawings is represented a rice hulling machine embracing my improvements, and consists of conical revolving rubber (A) surrounded by an external or rubber case (B, C) and supported by a strong frame (D) of proper form. The rubber, (A) may be either of metal or wood, in the form of the frustum of a cone with its periphery covered by a thick vulcanized rubber cloth (*g*) formed in alternate layers of cloth and rubber, in order to give to it greater strength; the outer surface is made of harder rubber than the interior and is incorporated with emery during the process of its being manufactured so as to give to a degree of hardness that will resist the cutting action of the rice, and consequent increased durability, with sufficient roughness to assist in removing the hull and polishing the kernel.

The cone (A) is supported in a horizontal position by its shaft which rests and turns in boxes (a) (f) at either end. It is adjusted to the outer casing (B C) by means of the sliding box (p) at one end, and an adjusting screw (d) at the opposite, which bears against the end of the shaft. The outer case (B C) is concentric with the cone and is divided into two parts (B) and (C), the lower one (C) of which is supported by the frame and the upper (B) either bolted or hinged to the lower, so that it can be raised or taken off. The grinding or attrition surface is formed by puncturing the metallic casing full of holes with the burs inward. Any other form made from any other hard material may be used if thought proper. A feeding hopper (k) is attached to the small end and on the upper side of the case; and a discharge spout (l) enters the opposite end lower end on the under side of the machine.

The revolving cone is gaged by the set screw (d) to the casing so as to leave sufficient space for the free passage of the rice, yet not so wide as to admit of the kernels piling or overriding each other to any extent.

Motion is communicated to the machine by a band (h) passing over a pully (g) on the cone shaft and connected with any prime mover. The machine being set in motion, the rice is fed through the hopper and is carried forward equally and regularly by the revolution of the cone and the action of gravity, from the small to the large end without the assistance of carriers. The velocity with which it passes through the machine is regulated by the pitch or slope of the cone, which may be varied in different machines to adapt them to the different kinds of grain. In all cases the pitch or inclination must depend on the velocity of the cone, which should never be so great that, the centrifugal power thus generated would throw the grain with sufficient force against the exterior metallic casing, as to break or fracture the kernel.

Adjusting screws may be attached to one end of the machine so as to elevate or depress the cone and the casing, thereby increasing the inclination, and thus vary the velocity with which the grain passes through.

The vulcanized rubber covering forms a hard, durable and elastic bed, yielding to grain so as not to crush or break it when the kernels override each other, while at the same time, the gritty surface given to it, assists in removing the hull and also polishes the kernel after the hull is taken off.

Having thus described my improvements in rice hulling machines, what I claim therein as new and desire to secure by Letters Patent is—

The employment of an elastic covering for forming one of the rubbers of a huller composed of alternate layers of cloth and vulcanized rubber, the outer surface of which is formed by incorporating with the vulcanized rubber, emery or other hard and gritty material, when the same is combined with an adjacent rubber of metal or other hard unyielding material with a grinding or breaking surface for the purposes herein set forth.

In testimony whereof I have subscribed my name.

HORATIO N. BLACK.

Witnesses:
    JOHN S. HOLLINGSHEAD,
    WM. MARTIN.